United States Patent [19]

McDougal

[11] 4,438,911

[45] Mar. 27, 1984

[54] QUICK SET HYDRAULIC VISE STRUCTURE

[76] Inventor: Thomas F. McDougal, 1415 Beech La., Fairmont, W. Va. 26554

[21] Appl. No.: 397,520

[22] Filed: Jul. 12, 1982

[51] Int. Cl.[3] .............................................. B23Q 3/08

[52] U.S. Cl. ...................................... 269/32; 269/186; 269/157; 269/224; 269/226

[58] Field of Search ............... 269/184, 186, 187, 224, 269/32, 35, 27, 157, 226; 308/3 A

[56] References Cited

U.S. PATENT DOCUMENTS 927,988 7/1909 Massey ................................ 269/186

3,927,872 12/1975 Sessody ................................ 269/32

FOREIGN PATENT DOCUMENTS 914839 7/1949 Fed. Rep. of Germany ...... 269/186

*Primary Examiner*—Robert C. Watson

*Attorney, Agent, or Firm*—Mason, Fenwick & Lawrence

[57] ABSTRACT

A quick set hydraulic work holding vise comprising an elongated stationary base plate member, a front stationary jaw fixed to the base plate member at a front end thereof and a rear jaw movable toward and away from the stationary jaw slidably movable along an elongated slide plate member supported for limited movement longitudinally. The slide member has an upwardly facing helical screw threaded channel and the movable jaw carries an interrupted worm screw interlocking device to interfit with the screw threads of the channel for locking the movable jaw longitudinally, which can then be locked against raising or skewing by tightening screw to compress the jaw on the slide plate member. A hydraulic piston is connected to the slide plate member for rapidly moving it and the movable jaw thereon to the gripping position.

14 Claims, 7 Drawing Figures

QUICK SET HYDRAULIC VISE STRUCTURE

BACKGROUND AND OBJECTS OF THE INVENTION

The present invention relates to a quick setting hydraulic vise or workholding device having a stationary jaw disposed toward the operator from the work receiving space and a movable back jaw disposed more remotely from the operator which has a release condition wherein it may be easily adjusted in any position within its range, quick acting worm thread means for locking of the back jaw near gripping position, and hydraulic means for quickly setting the movable back jaw in tightly gripping relation with the work.

Heretofore, many types of workholding vises have been produced, some of which are manually screw operated to move the movable jaw toward and away from the fixed jaw, or wherein motor means are provided for power activation of the clamping jaw structure. Some of such devices have involved manual positioning of the movable jaw member in proximate relation to the work and then activation of a hydraulic system to achieve final quick action clamping.

However, the present invention provides a quick set hydraulic vise construction wherein the stationary jaw is positioned towards the operator from the work receiving zone and is located toward the operator from the adjustable jaw, particularly adapting the system for use on a numerically controlled machine such that the datum line enables all programming to be in the first quadrant. The movable jaw is easily and quickly set at any position within its range, and is designed to allow maximum use of the working space of the machine while holding its front-to-back dimension as small as is practicable. It enables manual setting of the movable jaw to approximate work gripping position and provides a quick acting worm thread and handle device for adjustment of the rear movable jaw position, and hydraulic piston means for setting the movable jaw in a manner which grips the work tighter as load is applied and prevents upward movement as the jaw is tightened.

Other objects, advantages and capabilities of the present invention will become apparent from the following detailed description, taken in conjunction with the drawings illustrating a preferred embodiment of the invention.

DETAILED DESCRIPTION OF A PREFERRED EMBODIMENT

Figure 1:
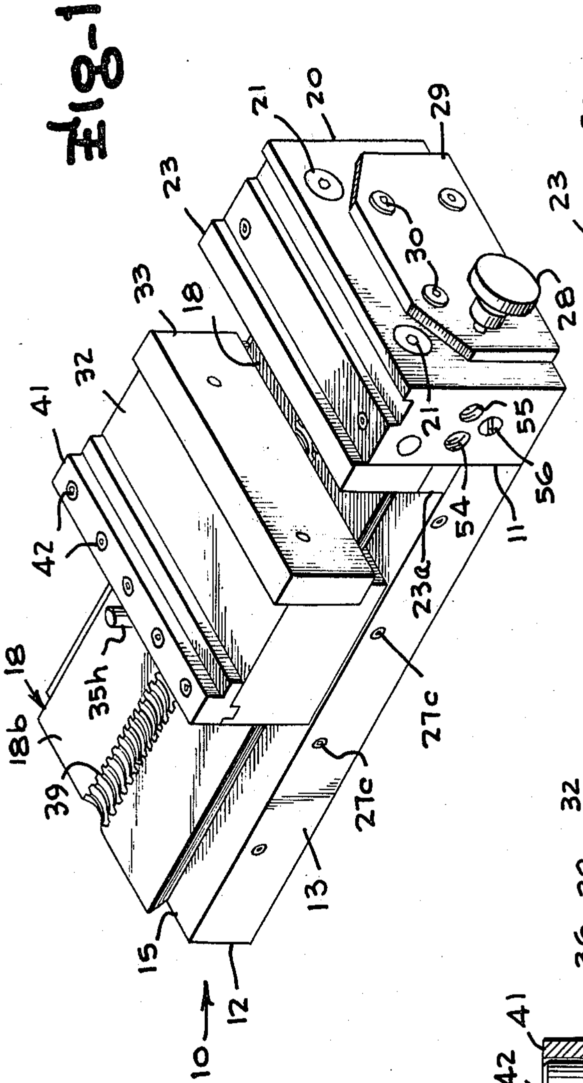
FIG. 1 is a front perspective view of a quick set hydraulic vise constructed in accordance with the present invention.
Figure 5:
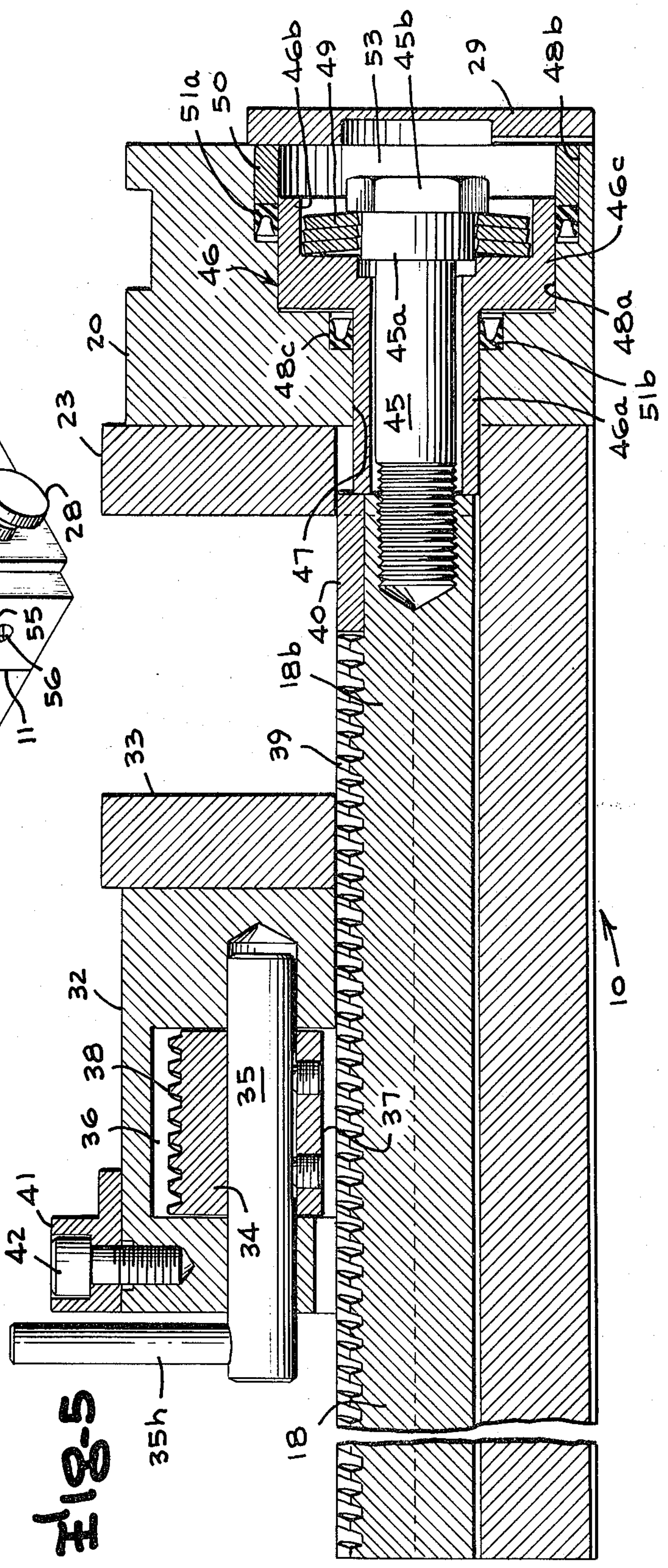
FIG. 5 is a longitudinal vertical section view taken along lines 5—5 of FIG. 2.
Figure 2:
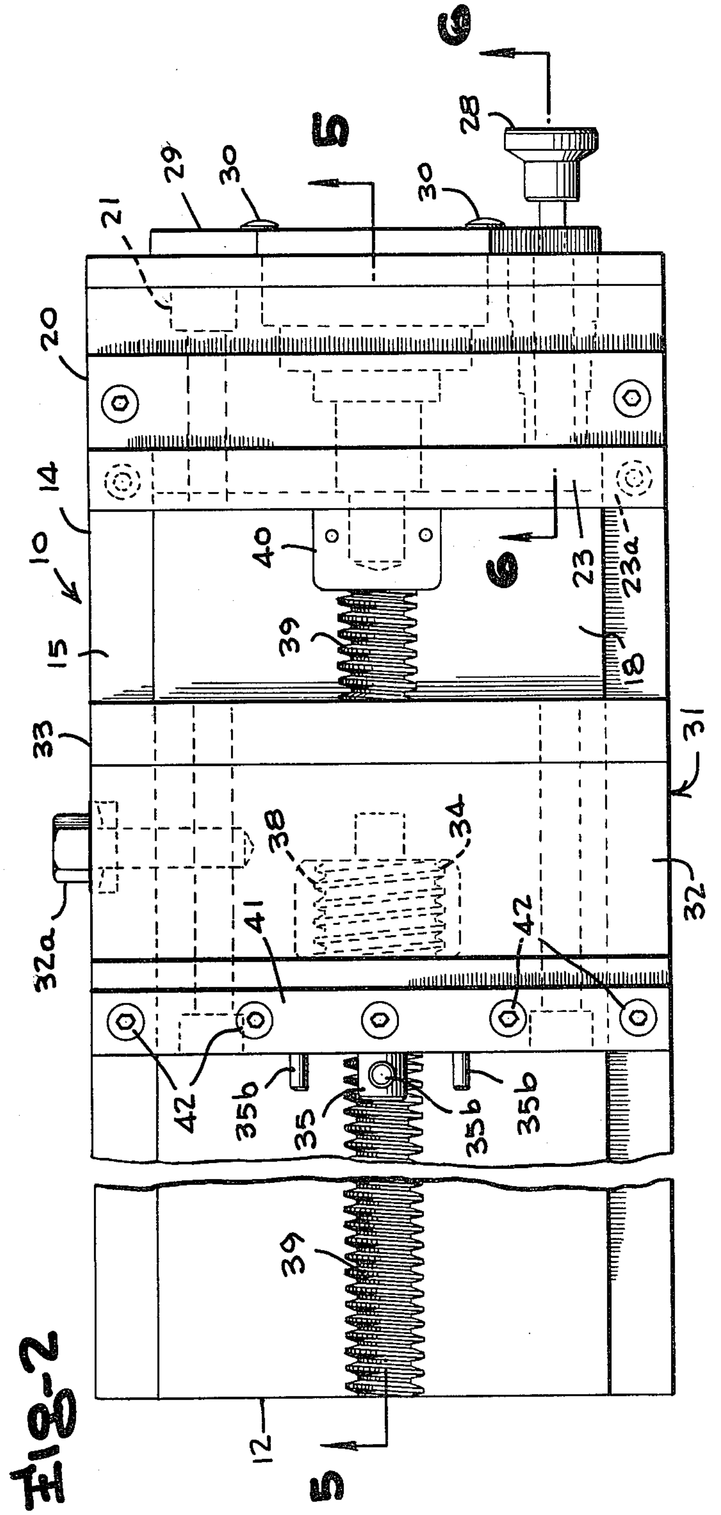
FIG. 2 is a top plan view of the quick set hydraulic vise.

Referring to the drawings, wherein like reference characters designate corresponding parts throughout the several figures, the quick set hydraulic vise of the present invention comprises an elongated base member of generally rectangular profile in top plan view, indicated by the reference character 10, having front and rear end walls 11, 12, side walls 13, 14, a flat bottom wall, and a top wall 15 interrupted by a wide, elongated dovetail recess 16. The dovetail recess, as will be apparent from FIGS. 2 and 5, is of substantially isosceles trapezoidal cross-sectional configuration with the inclined sides **16*a* thereof arranged in upwardly converging relation. An elongated slide block 18 is supported for sliding movement in the dovetail recess 16*a*, having a downwardly extending narrower dovetail cross-section lower portion 18*a* of appropriate width and cross-sectional shape to slidably interfit in the dovetail recess 16*a* of the base 16 and having an upper portion, over substantially the upper half thereof, indicated at 18*b*, forming a wider, elongated dovetail block lying above the horizontal plane of the upper surface of the base member 10, A stationary jaw member 20 is provided at the front end of the base member 10 and is rigidly fixed thereto by threaded bolts 21 recessed in drilled holes therefor in the stationary jaw 20, having enlarged heads with hexagonal sockets for Allen wrenches or similar driving tools to be received in enlarged front portions of the holes for the heads of the threaded bolts 21 and having threaded inner ends threaded into tapped openings in the base member 10. A rectangular jaw face or jaw blank 23 is fixed tc tbe stationary jaw 20 by similar mounting bolts extending through and recessed in suitable holes in the stationary jaw member in the tapped openings formed in an opening through the front face of the jaw face or blank member 23. The lower edge of the front or stationary jaw face or plate 23 is located immediately above the top surface of the slide 18 adjacent the front end of the slide and chip guards 23*a* occupy spaces below the lower corners of the jaw face 23 outwardly flanking the upper dovetail formation 18*b*** of the slide, preventing the entrance of chips, etc. into the space between the slide and stationary jaw.

Figure 4:
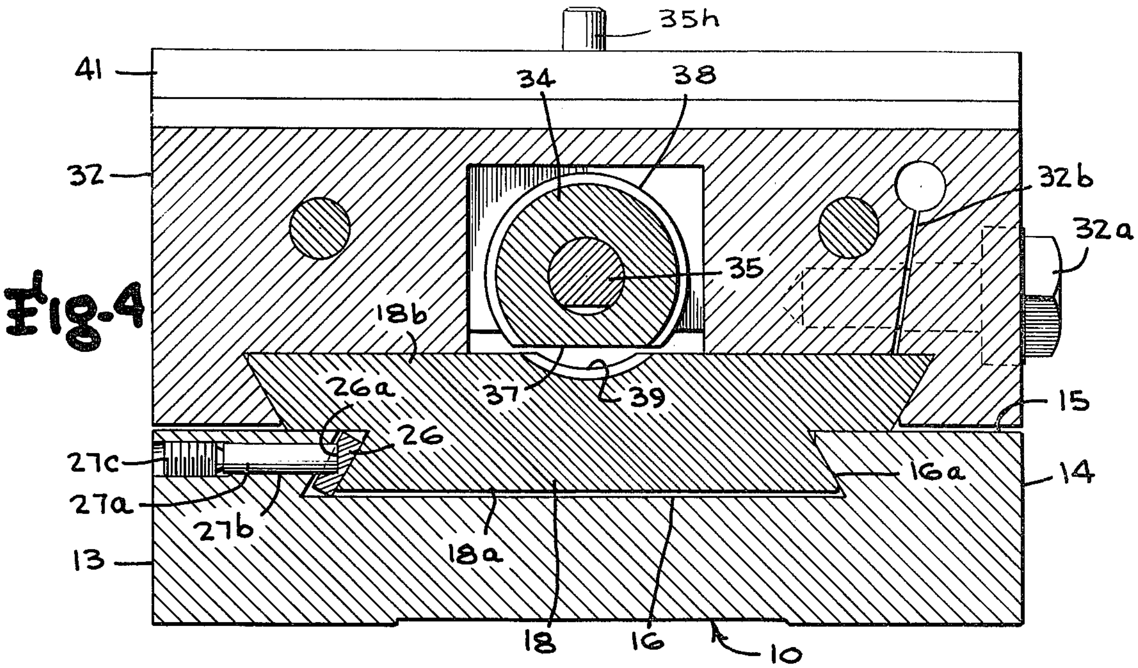
FIG. 4 is a vertical transverse section view thereof, taken along the line 4—4 of FIG. 3.

Along at least one side of the lower dovetail formation **18*a* of the slide 18 is a gib or wear member 26 having a cylindrical socket formation 26*a* therein conforming to the path of a cylinder whose axis is inclined relative to the face of the gib member 26, for example as illustrated in FIG. 4, into which projects a rod portion 27*a* of one of a plurality of two-piece gib spacer sets spaced along the gib 26. The inner ends of the portions 27*a* of the other spacer sets are cut on an angle to merely bear against the gib 26, and all the spacer sets extend through a similarly shaped bore 27*b* in one side of the base member 10. The position of the rod portion 27*a* of the gib spacer is regulated by a threaded second rod-like piece 27*c* of the gib spacer threaded into a threaded slightly larger diameter portion of the bore 27*b***.

The slide member 18 is capable of executing a limited small advancing and retracting stroke toward and away from, respectively, the stationary jaw 20 while being rigidly restrained against vertical or horizontal tilting movement by the lower dovetail formation **18*a* interfitting in the dovetail recess 16*a* of the base member 10**.

Advancing and retracting sliding movement is imparted to the slide block 18 by a quick acting hydraulic drive mechanism, as later described in detail, controlled from the valve operating knob 28 projecting forwardly from the stationary jaw member 20 and the cylinder cover plate 29 fixed to the front thereof by threaded bolts 30 similar to the threaded bolts 21 but extending through the plate 29 and into threaded sockets in the stationary jaw member 20.

Figure 3:
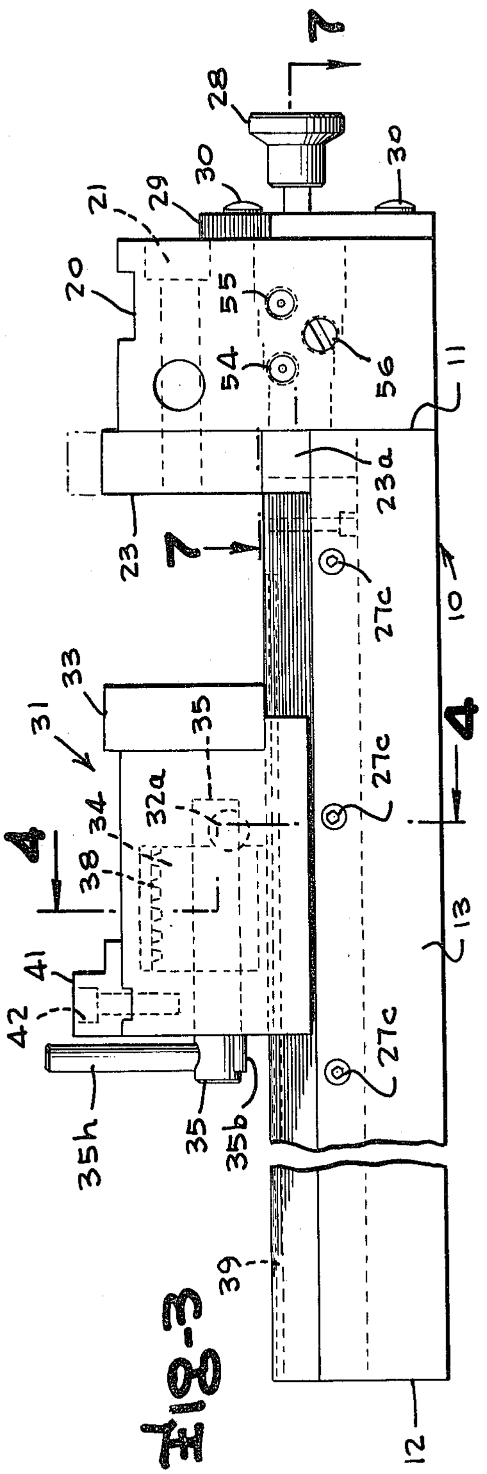
FIG. 3 is a side elevation view thereof, viewed from below FIG. 3.

The movable jaw assembly, indicated generally by the reference character 31, is supported for selective sliding movement along the upper dovetail formation 18*b* of the slide member 18, and comprises a generally rectangular movable jaw member 32 which transversely spans the width of the base member 10 and carries a jaw face or jaw plate 33 on the forwardly facing surface of the jaw member 32, secured thereto by mounting bolts similar to the mounting bolts 21 associated with the stationary jaw assembly. An interrupted or relieved worm gear locking member 34 mounted on a shaft 35 is housed within a suitable cavity 36 in the movable jaw member 32, and is provided with a flat 37 or relieved portion along a chord of the circular path defined by the substantially circular cross-sectional profile of the worm gear locking member 34 located so as to lie just above the horizontal plane of the upper surface of the upper dovetail formation 18*b* of the slide 18 in the unlocking position. Movement of the worm gear locking member 34 between locking and unlocking positions is regulated by the handle 35*h* fixed to the shaft 35. The helical screw threads 38 of the worm gear locking member 34 along the uninterrupted portions of the periphery thereof correspond to the pitch of, and are designed to interfit into, a screw threaded, elongated locking channel or trough 39 coursing from front to rear along the longitudinal center of the slide member 18, formed in the upper face thereof and having the configuration best shown in FIG. 2. Stop pins or limit pins 35*b* project rearwardly from the movable jaw member 32 and limit the range of angular travel of the handle 35*h*. The forwardmost portion of this upwardly opening, concave screw threaded locking channel 39 is protected against fillings and debris resulting from milling of the workpiece to be held thereby, by an insert protecting plate 40 as shown in FIGS. 2, 3 and 5. Also, surmounted on the upper rearmost portions of the movable jaw member 32 is a back jaw member 41 which transversely spans the width of the movable jaw member 32 and is fixed thereto by threaded bolts 42 similar to the previously mentioned threaded bolts 21 associated with the front stationary jaw 20.

Figure 7:
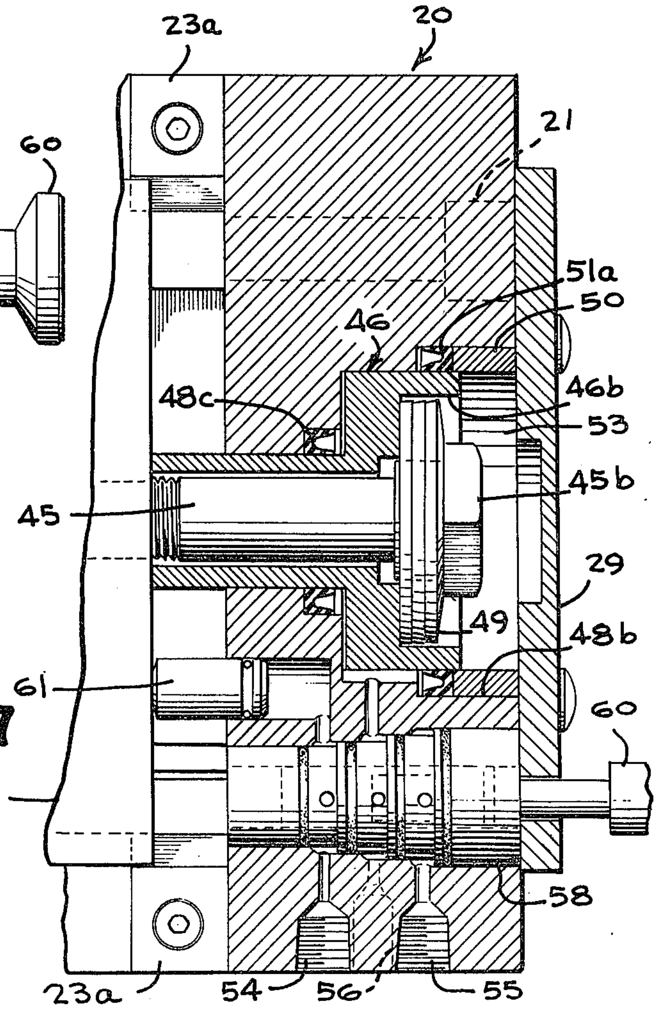
FIG. 7 is a fragmentary horizontal section view, taken along lines 7—7 of FIG. 3.

The hydraulic force applying mechaniam for the quick set hydraulic movement of the movable jaw assembly 31 is located primarily in the center portion of the fixed jaw member 20, and basically comprises a heavy screw or bolt member 45, best shown in FIG. 7, having a shank threaded at its rearmost end into a threaded socket in the slide member 18 extending through a piston member 46 having an annular tubular smaller cross section sleeve portion 46*a* encircling most of the shank portion of the bolt member 45 permitting relative axial movement of the bolt member 45 within the bore of the piston 46, and the sleeve portion 46*a* being, in turn, slidably received in a cylindrical bore 47 opening through the rear surface of the fixed jaw member 20, The bore 47 communicates with a larger diameter intermediate cylindrical cavity portion 48*a* sized to form a close fit slidably receiving an enlarged, generally cup shaped piston head 46*c*, providing a forwardly opening cylindrical recess 46*b* in which are received a plurality of annular, truncated conical disk springs 49 encircling a cylindrical collar formation 45*a* immediately adjacent the enlarged head 45*b* of bolt 45. A larger cross section front cylindrical cavity portion 48*b* having a slightly larger diameter than the intermediate bore portion 48*a* receives an annular cylindrical spacer 50, and also houses a sealing ring 51*a* sealing the periphery of the piston head 46*c*. A similar sealing ring 51*b* surrounds the sleeve portion 47 of the piston member 46 adjacent the enlarged piston head to form a seal against hydraulic fluid leakage from the chamber formed by the bore portion 48*c*. The cylinder cover plate 29 forms a forward closure for the cavity 48 housing the enlarged cylinder bead 46*c* and spacer 50.

Figure 6:
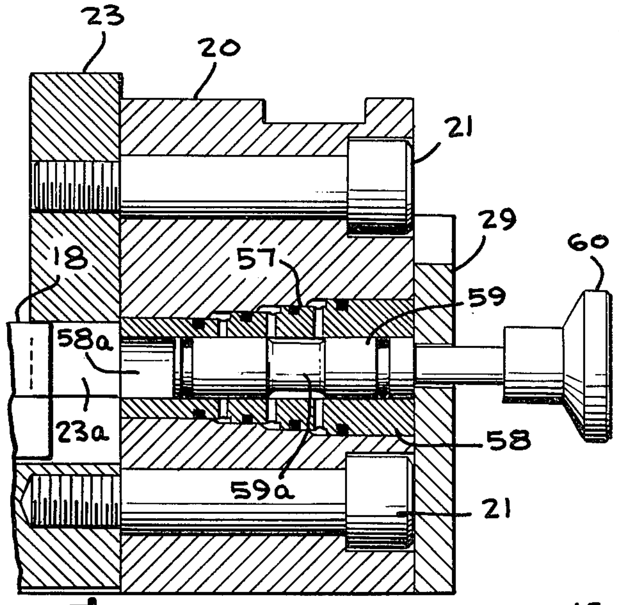
FIG. 6 is a vertical section view of the stationary jaw and valve control knob and sleeve, taken along lines 6—6 of FIG. 2.

As is illustrated in FIGS. 5, 6 and 7, the stationary jaw member 20 is provided with hydraulic fluid passages and a valve spool housing bore and valve assembly for controlling hydraulic fluid flow to the piston 46, including a pressure port fitting cavity 54 and return port fitting cavity 55 in one side of the stationary jaw member 20, with appropriate hydraulic conduit fittings therein, as well as a relief valve 56, connected by appropriate passages with the valve assembly chamber 57. The chamber 57 has a series of stepped, different diameter bore portions housing a valve sleeve member 58 having sections of correspondingly different diameter cylindrical portions interfitting in the different diameter sections of the valve chamber 57, sealed against the surfaces of the chamber 57 by "O" rings and having diametric bores extending from their peripheries to the elongated center bore 58*a* of the valve sleeve member 58 which slidably receives the valve spool 59. The spool 59 has a knob 60 on the outermost end thereof for axial adjustment of the valve spool 59 and knob 60 to different axial positions along the valve sleeve bore 58*a*.

The relieved channel formation 59*a* of the valve spool 59 establishes communication paths through internal passages drilled in the stationary jaw member 20 to hydraulically drive the piston 46 to either the clamping position or cause it to retract to the release position in a quick acting manner. For example, adjustment of the valve spool 59 to the clamping position communicates the pressure port 54 with the chamber 48*c* at the rear of the piston head 46*c* and communicates the return port 55 with the chamber 53 at the front of the piston head 46*c* to drive the piston 46, the bolt or screw 45 carried thereby, and the slide member 18 and adjustable jaw assembly 31 interlocked therewith forwardly to the clamping position. Adjustment of the valve spool 59 to the release or retract position reverses the communication of chambers 48*c* and 53 with the ports to connect them respectively with return port 55 and pressure port 54 for quick hydraulic retraction of the adjustable jaw assembly 31 to the release position. To insure this retraction movement, there is also provided a retract piston 61 as shown in FIG. 7 provided in a cavity opening through the rear face of the stationary jaw block 20 and communicating through the valve sleeve member 58 with the pressure port 54 when the valve spool 59 is in the retract position to bear against the forward face of the slide member 18 and assist in forcing it rearwardly to the release position.

With this construction, assuming the worm gear locking member 34 and its associated shaft 35 and handle 38 are adjusted to the release position wherein the flat 38 is at the downwardly facing or six o'clock position completely disengaging the teeth of the worm gear locking member from the teeth of the screw thread channel 39 of slide member 18, the movable jaw assembly 31 can be readily coarse adjusted by manually sliding it along the slide member 18 to an appropriate position to receive the workpiece between the jaw plates 23, 33 with the jaw plates located in light contact or immediately adjacent the opposite faces of the workpiece. The adjustable jaw assembly 32 is then interlocked in the coarse adjusted position with the slide member 18, by engagement of the worm teeth 38 on the worm gear locking member 34 in the female screw threads cut in the channel 39 of the slide member 18 by appropriate rotation of the handle 38, shaft 35 and worm gear locking member 34 to bring the teeth 38 into the screw threads of the channel 39. The movable jaw is also then clamped tightly to the slide by adjustment of the locking screw 32*a*, which distorts the portion of the movable jaw block 32 outwardly of the slit 32*b* to be drawn tightly against the confronting surface of the slide dovetail portion 18*b*. The vise can then be quick set to the clamping position by adjusting the knob 60 of the valve assembly 28 to communicate the pressure and return ports 54, 55 of the hydraulic system respectively with the chambers 48*c* and 53 associated with the head of the piston head 46*c*, thus forcing the piston 46 forwardly, carrying with it the bolt 45 threaded to the slide member 18 and the adjustable jaw assembly 32 interlocked therewith.

By this mechanism, it will be seen that the hydraulic cylinder action is direct acting, providing a pull type cylinder which quickly draws the adjustable clamping jaw assembly 32 to the clamping position. While the hydraulic system is adjusted to maintain the movable jaw in the clamping position, any momentary failure of the hydraulic system will not release the work, as the piston 46 is cushioned by the disk springs 49 providng the effect of a hydraulic accumulator, which, in conjunction with a check valve (not shown) provided in the pressure port 54, provides the safety feature of holding the work firmly gripped between the jaw plates 23, 33 in the event of momentary failure of the hydraulic system. As will be evident from FIG. 5, the forwardly directed convergence of the annular springs 49 exerts a forwardly directed resilient bias on the bolt or screw member 45 and thus the slide 18 and movable jaw assembly 31, so that slight leakage of hydraulic fluid would not result in immediate loss of all clamping pressure, as the disk springs would absorb the slight movement caused by such loss. Also, additional safety features are provided by incorporating the relief valve 56 in the system, to protect the vise from excessive hydraulic pressure.

In order to shift the movable jaw assembly 31 rewardly to release the work, the knob 60 of the control valve spool 59 is adjusted to the release position, communicating the chambers 48*c* and 53 respectively with the return port 55 and pressure port 54, and simultaneously communicating the retract piston 61 with the pressure port, exerting a rearward pressure on the slide member 18 to insure rearward movement to the workpiece release position.

I claim:

1. A quick set hydraulic work holding vise comprising an elongated stationary base plate member having a fore-and-aft longitudinal axis, a front stationary jaw fixed to said base plate member at a front end thereof and a rear jaw movable toward and away from said stationary jaw along said longitudinal axis, an elongated slide plate member of narrower width than said base plate member overlying and extending centrally along substantially the length of the latter, means supporting the slide plate member for a limited predetermined range of longitudinal movement between a forward gripping position and a rearward release position for the movable jaw, means interfitting said movable jaw on the slide plate member for sliding movement of the movable jaw to a coarse adjustment position along the length of the slide plate member disposing the jaws at a work release position whereby a workpiece portion to be received between the jaws may be withdrawn therefrom, quick acting worm thread means for fine adjustment of the rear jaw to approach workpiece gripping position including an upwardly facing screw threaded trough-like channel substantially longitudinally spanning said slide plate member and rotatably adjustable worm tooth means carried by the movable jaw to interfit in the threads of said channel, means for rotating said worm tooth means between a release position and an interfitting position relative to said channel, hydraulic power means connected to said slide plate member for rapidly moving the slide plate member and the movable jaw thereon to said gripping position responsive to application of fluid pressure to the power means, and means for returning said slide plate member and movable jaw thereon to said release position upon removal of forwardly moving fluid pressure force from said hydraulic power means.

2. A quick set hydraulic work holding vise as defined in claim 1, wherein said slide plate member has an upwardly projecting dovetail cross-section formation extending the length thereof and said movable jaw has a downwardly facing dovetail cross-section channel sized to receive and slidably interfit with the dovetail formation, and a side portion of said movable jaw laterally flanking said dovetail formation of the slide plate member being deformable by locking screw means into tightly gripping relation with said dovetail formation for clamping the movable jaw thereto at its fine adjustment position.

3. A quick set hydraulic work holding vise as defined in claim 1, wherein said movable jaw has a downwardly opening chamber therein and said adjustable worm tooth means comprises an interrupted generally cylindrical worm screw member having an interruption defining a flat along a chord thereof which may be aligned in adjacent upwardly spaced parallelism with confronting upwardly facing surface portions of said slide plate member withdrawing the worm screw member completely from said threaded channel and having helical screw threads along the remainder of the periphery thereof to be interfitted in the threads of said channel upon rotation of said worm screw member about a horizontal axis of rotation, 4. A quick set hydraulic work holding vise as defined in claim 2, wberein said movable jaw has a downwardly opening chamber therein and said adjustable worm tooth means comprises an interrupted generally cylindrical worm screw member having an interruption defining a flat along a chord thereof which may be aligned in adjacent upwardly spaced parallelism with confronting upwardly facing surface portions of said slide plate member withdrawing the worm screw member completely from said threaded channel and having helical screw threads along the remainder of the periphery thereof to be interfitted in the threads of said channel upon rotation of said worm screw member about a horizontal axis of rotation, and said threaded channel being located in the upper surface of said dovetail formation of the slide plate member along the longitudinal center thereof.

5. A quick set hydraulic work holding vise as defined in claim 1, wherein said hydraulic power means includes a piston member supported for movement in said stationary jaw along an axis paralleling said longitudinal axis, said piston member encircling a bolt member coupled to said slide plate member permitting relative axial movement between the piston and bolt member, and disk spring members bearing against said piston member and shoulder surfaces of said bolt to be elastically stressed to a distorted condition when the hydraulic power means is conditioned to set the movable jaw and slide plate in gripping position providing the effect of a hydraulic accumulator for holding the work piece firmly gripped between said jaws upon momentary failure of the hydraulic system.

6. A quick set hydraulic work holding vise as defined in claim 2, wherein said hydraulic power means includes a piston member supported for movement in said stationary jaw along an axis paralleling said longitudinal axis, said piston member encircling a bolt member coupled to said slide plate member permitting relative axial movement between the piston and bolt member, and disk spring members bearing against said piston member and shoulder surfaces of said bolt to be elastically stressed to a distorted condition when the hydraulic power means is conditioned to set the movable jaw and slide plate in gripping position providing the effect of a hydraulic accumulator for holding the work piece firmly gripped between said jaws upon momentary failure of the hydraulic system.

7. A quick set hydraulic work holding vise as defined in claim 3, wherein said hydraulic power means includes a piston member supported for movement in said stationary jaw along an axis paralleling said longitudinal axis, said piston member encircling a bolt member coupled to said slide plate member permitting relative axial movement between the piston and bolt member, and disk spring members bearing against said piston member and shoulder surfaces of said bolt to be elastically stressed to a distorted condition when the hydraulic power means is conditioned to set the movable jaw and slide plate in gripping position providing the effect of a hydraulic accumulator for holding the work piece firmly gripped between said jaws upon momentary failure of the hydraulic system.

8. A quick set hydraulic work holding vise as defined in claim 4, wherein said hydraulic power means includes a piston member supported for movement in said stationary jaw along an axis paralleling said longitudinal axis, said piston member encircling a bolt member coupled to said slide plate member permitting relative axial movement between the piston and bolt member, and disk spring members bearing against said piston member and shoulder surfaces of said bolt to be elastically stressed to a distorted condition when the hydraulic power means is conditioned to set the movable jaw and slide plate in gripping position providing the effect of a hydraulic accumulator for holding the work piece firmly gripped between said jaws upon momentary failure of the hydraulic system.

9. A quick set hydraulic work holding vise as defined in claim 1, wherein said front stationary jaw includes a retract piston and hydraulic system passages communicating therewith for activating the retract piston to exert rearward moving force on said slide plate member for returning the latter and said movable jaw to the rearward release position upon removal of forwardly moving fluid pressure force on said piston.

10. A quick set hydraulic work holding vise as defined in claim 2, wherein said front stationary jaw includes a retract piston and hydraulic system passages communicating therewith for activating the retract piston to exert rearward moving force on said slide plate member for returning the latter and said movable jaw to the rearward release position upon removal of forwardly moving fluid pressure force on said piston.

11. A quick set hydraulic work holding vise as defined in claim 3, wherein said front stationary jaw includes a retract piston and hydraulic system passages communicating therewith for activating the retract piston to exert rearward moving force on said slide plate member for returning the latter and said movable jaw to the rearward release position upon removal of forwardly moving fluid pressure force on said piston.

12. A quick set hydraulic work holding vise as defined in claim 5, wherein said front stationary jaw includes a retract piston and hydraulic system passages communicating therewith for activating the retract piston to exert rearward moving force on said slide plate member for returning the latter and said movable jaw to the rearward release position upon removal of forwardly moving fluid pressure force on said piston.

13. A quick set hydraulic work holding vise as defined in claim 1, wherein said slide plate member includes a downwardly extending lower dovetail cross-section formation slidably interfitted in an elongated upwardly facing dovetail recess in said base plate member, said base plate member including an elongated wear strip interposed between a side of said dovetail recess and a confronting side of said lower dovetail formation of said slide plate member and a plurality of set screw means threaded in said base plate member having means bearing against said wear strip at longitudinally spaced positions therealong for adjustment of the latter relative to said lower dovetail formation.

14. A quick set hydraulic work holding vise as defined in claim 2, wherein said slide plate member includes a downwardly extending lower dovetail cross-section formation slidably interfitted in an elongated upwardly facing dovetail recess in said base plate member, said base plate member including an elongated wear strip interposed between a side of said dovetail recess and a confronting side of said lower dovetail formation of said slide plate member and a plurality of set screw means threaded in said base plate member having means bearing against said wear strip at longitudinally spaced positions therealong for adjustment of the latter relative to said lower dovetail formation.

* * * * *